Aug. 6, 1963 F. R. FLUHR 3,100,298

ANALOG-TO-DIGITAL INSTANTANEOUS CONVERTER

Filed Feb. 27, 1959 4 Sheets-Sheet 1

INVENTOR
FREDERICK R. FLUHR

BY Richard C. Reed

ATTORNEY

ANALOG-TO-DIGITAL INSTANTANEOUS CONVERTER

Filed Feb. 27, 1959

4 Sheets-Sheet 2

INVENTOR
FREDERICK R. FLUHR

BY Richard C. Reed

ATTORNEY

INVENTOR
FREDERICK R. FLUHR

BY Richard C Reed
ATTORNEY

INVENTOR
FREDERICK R. FLUHR

BY Richard C. Reed
ATTORNEY

United States Patent Office 3,100,298
Patented Aug. 6, 1963

3,100,298
ANALOG-TO-DIGITAL INSTANTANEOUS CONVERTER

Frederick R. Fluhr, 7234 E. Fort Foote Terrace, Fort Foote, Md.
Filed Feb. 27, 1959, Ser. No. 796,185
4 Claims. (Cl. 340—347)
(Granted under Title 35, U.S. Code (1952), sec. 266)

The invention described herein may be manufactured and used by or for the Government of the United States of America for governmental purposes without the payment of any royalties thereon or therefor.

This invention relates to very high speed analog to digital converters and more particularly to very high speed analog to digital converters in which direct current levels are evaluated with respect to a reference.

It has long been a problem of analog to digital converters that speed of operation be sacrificed to accuracy, or that accuracy be sacrificed for speed of operation. Prior converters used and required a sequence of events external to such converters for their operation and control. The converter of this invention uses stable components to their greatest advantage to accomplish speed with a reasonable degree of accuracy. There is no reliance upon an externally controlled sequence of events other than the application of the signal and the removal of the result. This converter can carry out its own processes at its own rate with the only speed limitation being the settling times of the circuits rather than being dependent upon an ordered sequence of events controlled by some outside means.

It is, therefore, an object of this invention to provide an analog to digital converter which converts, or encodes, at a higher rate of speed.

Another object is to provide an analog to digital converter which combines a reasonable degree of accuracy with high speed of operation.

Still another object of this invention is to provide a stable analog to digital converter.

A further object of this invention is to provide an analog to digital converter in which the speed limitations are its own and not those of an outside control means.

A still further objective is to minimize external control.

Another object of this invention is to provide an analog to digital converter which compares direct current levels to a fixed reference level.

The exact nature of this invention as well as other objects and advantages thereof will be readily apparent from considerations of the following description relating to the annexed drawings in which.

Briefly, the circuit of this invention is a very high speed analog to digital converter in which levels of an analog input direct current signal are compared with a plurality of different reference levels. The polarity of the input signal is opposite to the polarity of the reference levels. For each bit of the final quantized voltage, a different reference voltage level is provided. The voltage level for each of the successive bits differs from the voltage level of its preceding bit by the factor one-half. The analog input to be quantized, that is, the direct current to be compared, is applied to an operational amplifier which drives a line of two-state operational amplifiers, called comparators. The input end of the comparators includes the analog input signal and one of the oppositely polarized voltage levels. For each bit in the final quantized output, there is one two-state operational amplifier. Several resistor adding networks are provided to assure that the proper signal strength is applied to each of these two-state operational amplifiers. Gates incorporating diodes are included to provide subtracting signals to each of the following stages when the gates are activated, i.e., opened. The entire unit converts an analog voltage input to an equivalent binary encoded output. This output consists, for example, of a high level for a "one" and/or a low level for a "zero" in the proper position for proper binary encoding.

The circuit of this invention includes the following structure. A first operational amplifier, for buffering purposes, is connected in parallel with a plurality of stages. There is one stage for each binary bit needed to encode the analog input. Each stage includes an input terminal, a common junction, a fraction of a standard voltage magnitude which is representative of the analog voltage value of one bit of the digital output signal, and a plurality of resistors of like value R. There is one resistor of value R connected between the input terminal and the common junction and one resistor of value R connected between the fractional standard voltage source and the common junction. Each stage further includes a comparator and amplifier unit connected at its input to the common junction and at its output to a gate. Also connected to the gate is the fractional standard voltage level. A resistor of value R is connected between the gate and the common junction of each of the succeeding stages. Binary output values are derived from the output of the comparator and amplifier of each stage.

Figure 1:
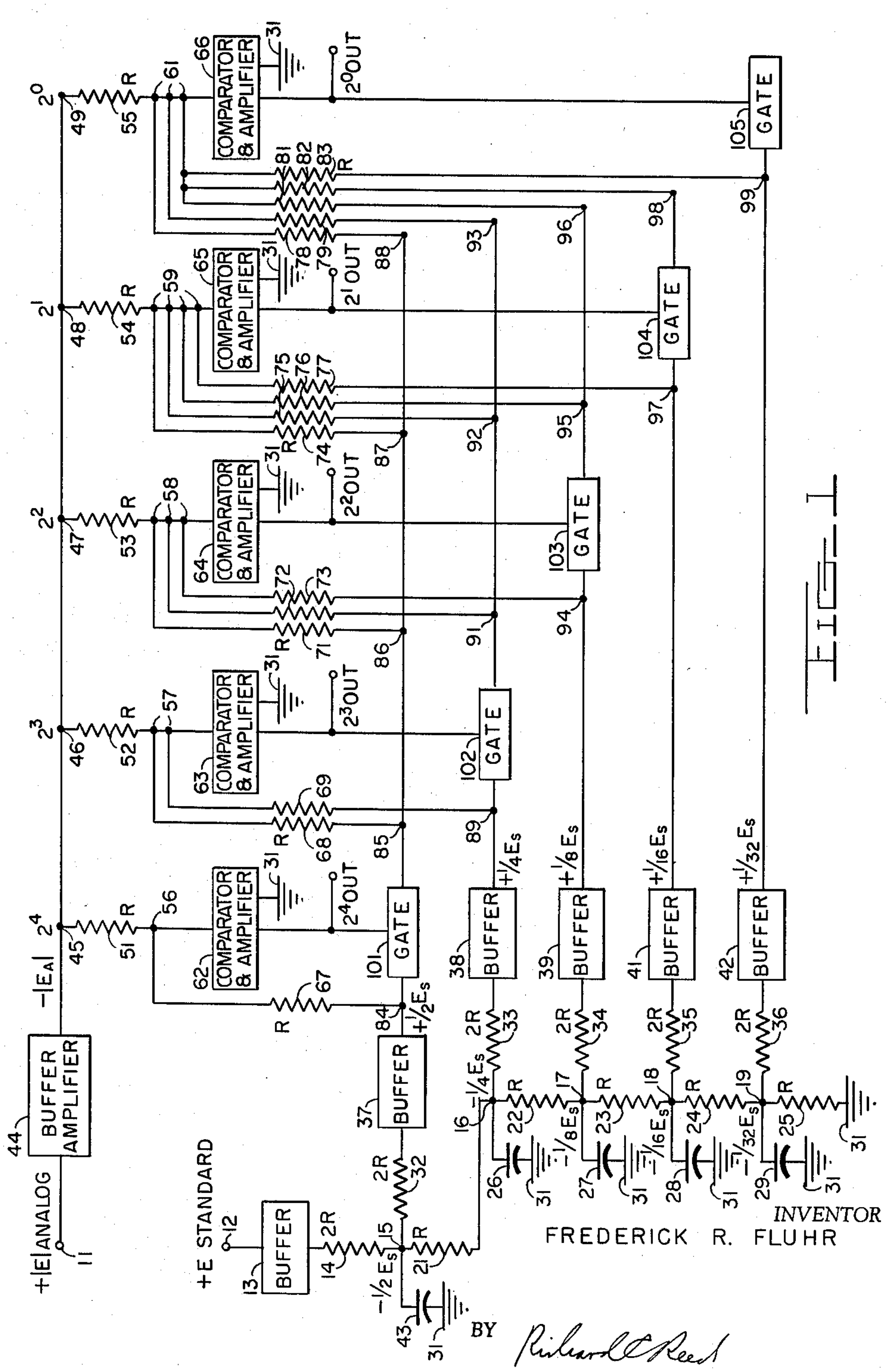
FIG. 1 shows a schematic diagram of a five stage embodiment of this invention.

The circuit of this invention incorporates the following principles. The first operational amplifier presents the absolute value of the input analog voltage signal to the input terminals of the several stages in a polarity which is opposed to the polarity of the fractional standard voltage magnitudes. Since the input signal and the oppositely polarized fractional standard voltage level are both applied to the common junction in a stage across matched resistors, the polarity of the resultant signal on the common junction is indicative of the magnitude of the input signal. Should the resultant be positive, as illustrated in FIG. 1 for example, the input signal would be below the value of the fractional standard voltage, the comparator and amplifier would not be changed from the low, quiescent level, and no output would be applied to the gate, leaving it closed. Should the resultant signal on the common junction of any of the stages be negative, in the same example, the comparator and amplifier unit would be triggered upon the change from positive to negative to flip to its high level and an output would be applied to the gate to open the gate. The opening of the gate causes the resultant signal on the common junction of all of the succeeding stages to be lowered by the fractional standard voltage level of the operated stage. Should the resultant signal on the common junction of any of the succeeding stages be negative after the resultant signal has been lowered by the opening of the gate of an operated stage, the comparator and amplifier connected to such a common junction would operate in the same manner as the operated stage. The operation or inoperation of the several stages of the converter provides the binary encoding of the input analog voltage. If the polarities for the analog input voltage and the input standard voltage are opposite to the polarities as illustrated in FIG. 1, the binary outputs would be low for a binary "one" and high for a binary "zero." The polarities between the standard voltage levels and the analog input voltage applied to the comparators must be opposite polarities.

Resistive networks are provided to give the proper signal strength at the inputs of each of the two-state operational amplifiers. These inputs remain at a virtual ground level at all times because of the characteristics of the operational amplifiers. The resistors in the resistive networks are all of a same, matched value, determined by circuit parameters. Non-linear feedback means are provided to cause the operational amplifiers to be two-state devices, that is, to be stable only in high or low states, and still perform as operational amplifiers.

An operational amplifier is one which has a very high negative gain from input to output and is usually connected with a feedback to lower the gain for stable operation.

The operation of this circuit is extremely fast, being limited only by the speed of operation of the amplifiers and their associated components. The number of binary bits in the amplifier chain can be made as great as desired within the limits of accuracy of present components.

Referring now to the drawings, wherein like reference characters designate like or corresponding parts throughout the 7 figures, there is shown in FIG. 1 a typical embodiment which provides five bits, or 32 increments, of binary information. The analog input voltage to be converted is applied at input 11. A standard voltage is applied at input 12 to a buffer amplifier 13. The output of buffer amplifier 13 is applied through resistor 14 to provide a value at a junction 15 which is, equal in magnitude, to one half the standard voltage, $E_s$, but opposite in polarity. A plurality of junctions designated as 15, 16, 17, 18, and 19 are coupled to ground by a like plurality of capacitors designated as 43, 26, 27, 28 and 29, respectively, in order to remove extraneous signals or noise. Resistors 21, 22, 23, 24 and 25 are provided to divide the standard voltage into the several levels which are representative of the binary bits. Resistor 21 is connected between junctions 15 and 16, resistor 22 is connected between junctions 16 and 17, resistor 23 is connected between junctions 17 and 18, and so on. One side of resistors 32, 33, 34, 35 and 36 is connected individually to junctions 15, through 19, respectively. The other side of resistors 32 through 36 is connected individually, to a plurality of buffer amplifiers 37, 38, 39, 41 and 42, each having an amplification factor of minus one, for example, in order to provide output potentials at a plurality of junctions 84, 89, 94, 97 and 99 of the same potential but of opposed polarity as that potential at junctions 15 through 19, respectively.

The input analog signal to be quantized is applied through terminal 11 to an input buffer amplifier 44 which has an amplification factor of minus one. The output of buffer amplifier 44 is equal in absolute value to the input analog voltage but is of a different polarity. This differently polarized, negative for example, analog voltage is applied simultaneously to a plurality of terminals 45, 46, 47, 48 and 49. A plurality of common junctions 56, 57, 58, 59 and 61 are provided. Connected between one of each of terminals 45 through 49 and one of each of common junctions 56 through 59 and 61 is one of the resistors, of value R, 51, 52, 53, 54 and 55, respectively. Connected between one of each of the common junctions 56 through 59 and 61 and one of each of the standard voltage junctions 84, 89, 94, 97 and 99 is one of the resistors, of value R, 67, 69, 73, 77 and 83, respectively. It is at the common junctions 56 through 59 and 61 that the input analog voltage is compared with the standard voltage levels. This comparison is accomplished by the provision of a plurality of comparator and amplifier units 62, 63, 64, 65 and 66 each of which derives its input signal through a connection to one of the common junctions 56 through 59 and 61. The comparator and amplifier units are virtually at ground potential as indicated by the connection to ground 31. The comparator and amplifier units are so dimensioned to be a low condition until such time as the input thereon becomes a preselected polarity. Instantly upon the change of polarity of the input signal to the preselected polarity, the comparator and amplifier unit operates to produce a very high output signal. It is this sensitivity to polarity change that provides the desired comparison of the input analog voltage to a standard voltage which is representative of the level required of the input to be equivalent to a bit of the binary encoding of such input analog voltage. To continue the above example, when the signal on common junction 56 becomes negative, that is, the input analog voltage exceeds in absolute value one half of the standard voltage $E_s$, the firing of the comparator and amplifier 62 reveals that the analog value of the input signal exceeds the binary value of the first bit, since the analog input signal exceeds one half of $E_s$. Had the signal on common junction 56 remained positive, that is, the half of $E_s$ was not exceeded by the input analog signal, the comparator and amplifier 62 would not have fired, but would remain in its low condition to reveal that the input signal is of less value than can be represented by the first bit of the binary encoding.

The outputs of the comparator and amplifier units 62 through 66 are connected such that one of such outputs is connected to one of a plurality of gates 101, 102, 103, 104, and 105, respectively. Gate 101 is also connected to junction 84 where one half of $E_s$ is available. Gate 102 is also connected to junction 89 where one fourth of $E_s$ is available. One eighth of $E_s$ is applied to gate 103 through junction 94. One sixteenth of $E_s$ is applied to gate 104 through junction 97, while $\frac{1}{32}$ of $E_s$ is applied to gate 105 through junction 99.

Gate 101 is further connected to junctions 85, 86, 87 and 88, gate 102 is connected to terminals 91, 92 and 93, gate 103 is connected to terminals 95 and 96 and gate 104 is connected to terminal 98. A further plurality of resistors of value R are connected one resistor 68, between junction 85 and common junction 57 of the second stage, resistor 71 between junction 86 and common junction 58 of the third stage, resistor 74 between junction 87 and common junction 59 of the fourth stage, resistor 78 between junction 88 and common junction 61 of the fifth stage. Resistor 72 of value R is connected between junction 91 and common junction 58 of the third stage. Resistor 75 of value R is connected between junction 92 and common junction 59 of the fourth stage, while resistor 79 is connected between junction 93 and common junction 61 of the fifth stage. Resistor 76 of value R is connected between junction 95 and common junction 59 of the fourth stage, and resistor 81 is connected between junction 96 and common junction 61 of the fifth stage. Resistor 82 of value R is connected between junction 98 and common junction 61 of the fifth stage.

All of the resistors R are matched in value. Such value need not be any particular value, but a value which lies within a range limited by the considerations of the circuit. The selection of the several resistors R is simply a matter of finding resistors which are equal in value with a first selected resistor the value of which is within the required limits.

Upon the operation of the comparator and amplifier unit of any stage, an output signal is provided which is applied to the gate of that stage to open the gate to apply the fractional level of $E_s$ to the common junction of all of the succeeding stages thereby subtracting that fractional level of $E_s$ from the analog input signal applied to the succeeding stages. Once the fractional standard voltages which are applied by the preceding stages through the appropriately open gates have settled, the comparator of that stage is then capable of determining whether the remainder of the analog input signal is of a magnitude greater or less than the level of the fractional standard voltage of that stage. If the level of the remainder of the analog input signal is less than the level of the fractional standard voltage for that stage, the stage will remain in its low condition. The first succeeding stage in which the level of the fractional standard voltage is less than the remainder of the analog input voltage will be the stage to flip and cause a "one" binary output signal (or indication) as well as open the gate associated therewith to subtract the proper fractional standard voltage level of that stage from the succeeding stages.

So it is seen that the several stages are responsive to input analog signals over a specified range which is representative of the value of the binary bit assigned thereto. It is noted that the accuracy of the system is dependent upon the accuracy of operation of the comparator and amplifier 62 of the first stage because of the great range of operativeness and required accuracy at the limits of operation. The comparator and amplifier 66 of the last stage requires similar accuracy but is operative over such a small range that the problem of such accuracy is minimal compared with the problem of providing accuracy to comparator and amplifier 62 in the first stage. It is also noted that the converter of this system will accommodate input signals which are equal to or less than the standard voltage provided. Further, gate 105 in the last stage is unnecessary since there are no stages which follow it to require any clamping of the last used fraction of the standard voltage.

The standard voltage source and divider with the buffer amplifiers are well known and have been reported fully in: "Coding by Feedback Methods," B. D. Smith, Proceedings of Institute of Radio Engineers, vol. 41, #8, August 1953, p. 1053.

Figure 2:
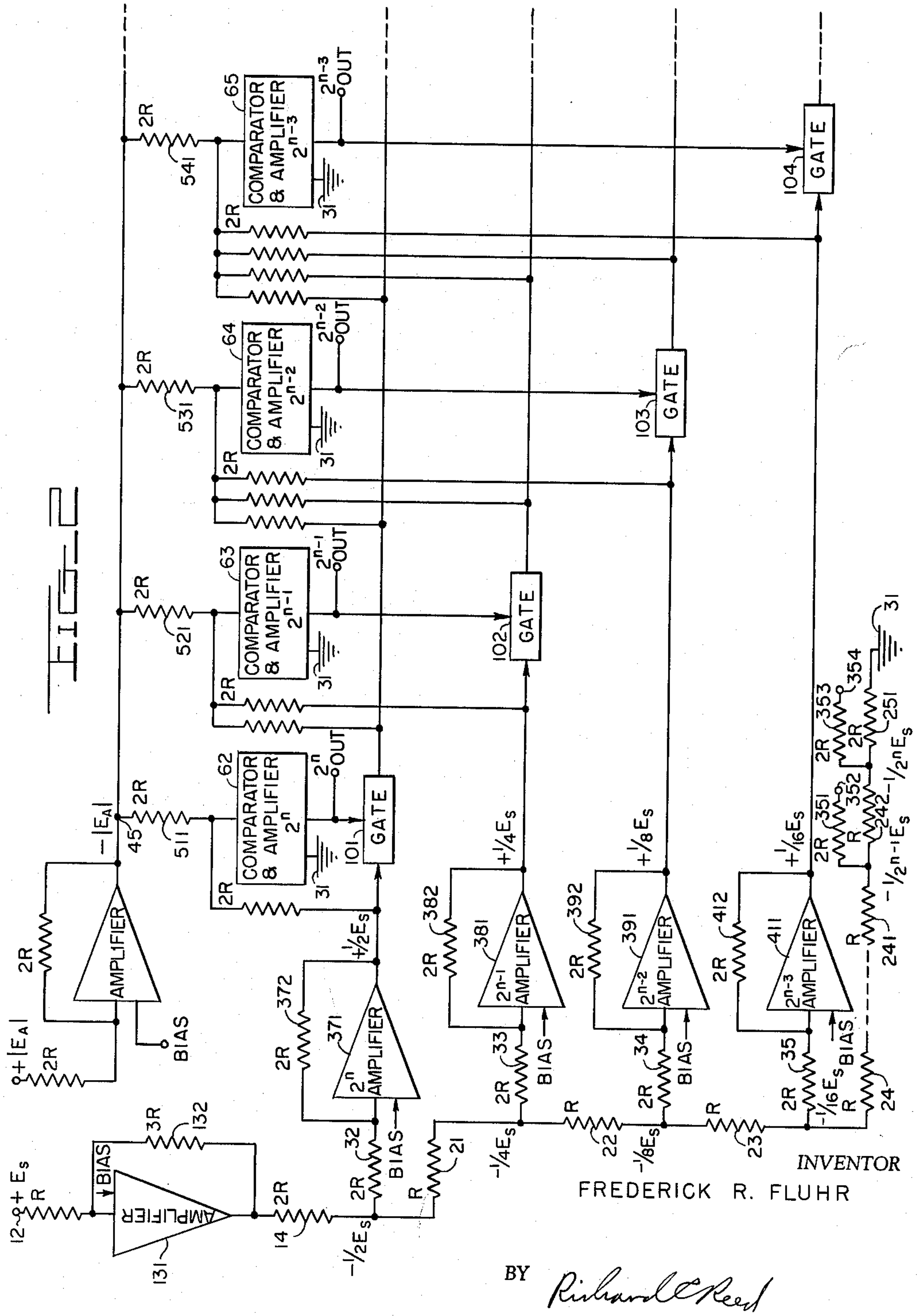
FIG. 2 shows a schematic diagram of a generalized embodiment of this invention.

FIG. 2 differs from FIG. 1 in that it is a more generalized showing of the invention. It is to be noted that the buffer amplifiers are shown as operational amplifiers with a bias source applied thereto. The resistance values of the resistors which are jointed at a junction through which the difference signal is applied to the comparator and amplifiers are each represented as having the value of 2R. The one to one relationship or the relationship of the value of such resistors is maintained as in FIG. 1.

Figure 3:
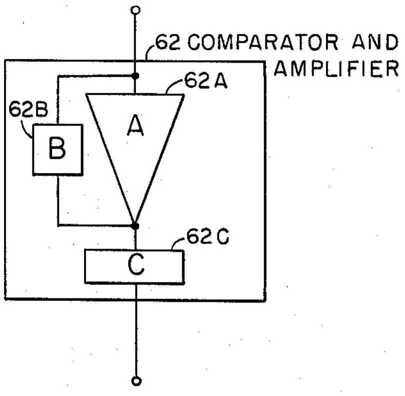
FIG. 3 shows in block diagram a typical comparator and amplifier unit included in the converter.

FIG. 3 shows in block diagram form the detail of the comparator and amplifier 62 which is typical of all of the others. The comparator includes amplifier 62A with the feedback circuit 62B and amplifier 62C. The several dividers shown in FIG. 2 which include resistor 241, 242, 251, 351, 353 are given to show that the number of stages which can be added is unlimited in theory and in practice is found to be limited only by the accuracy obtainable in the components of the system.

The system of this invention can be thought of as handling direct currents as a comparison of different levels with respect to some reference, which in the case here is zero potential. It can be thought of as an alternating current system where series of pulses are quantized and the output can be an output of alternating current numbers to be representative of the binary bits. The outputs of the comparators and amplifiers are considered to be the binary zero when the output is low, in our case zero, and the binary output is considered to be one when a potential is provided by the comparator and amplifier.

In the FIGURES 3 through 6 are shown one group of components for doing the analog to digital conversion which is desired in this invention and are to be considered as being typical but not the only elements of structure that will provide a comparable result. For example, the comparator and amplifier shown in FIG. 3 can be any electronic device which can sense or detect small signal values and give an output indicating whether the signal is above or below a reference value.

Figure 4:
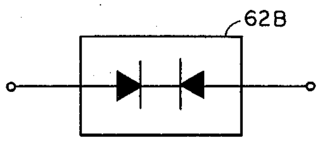
FIG. 4 shows details of a typical feedback circuit in the comparator and amplifier unit.

FIG. 4 shows that the feedback circuit 62B includes a pair of anode coupled Zener diodes or double anode diodes. It is by the use of such diodes in the feedback circuit that the comparators perform as two-stable state devices as well as operational amplifiers. The amplifier A, a part of the comparator, provides very high gain. When an input signal exceeds zero, the amplifier A raises the signal to such a value that the feedback loop B operates to cause the overall gain from input to output to become low. The converse is true when the input signal goes in the opposite direction. The overall gain is clamped to the level of the breakdown level of the Zener diodes. The comparator at the most significant binary bit has to be of sufficient sensitivity to detect well within the range of the voltage differences of the least significant binary bit.

Figure 5:
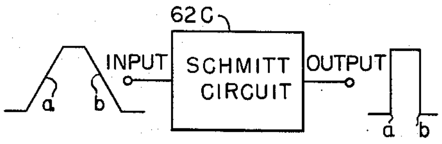
FIG. 5 shows a typical amplifier included in the comparator and amplifier unit.

FIG. 5 shows that the amplifier 62C can be a Schmitt amplifier which converts the output of the comparators A and B to a standardized form for operating the gate. The Schmitt amplifier also provides the necessary driving power to operate the gates.

Figure 6:
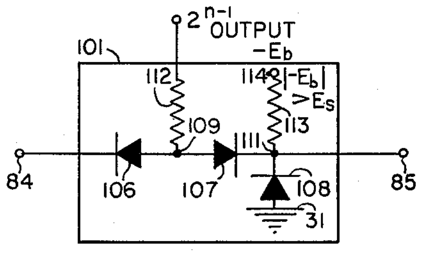
FIG. 6 shows details of a typical gate of the converter.

FIG. 6 shows details of a typical gate such as found in gate 101. Simplicity and high speed characterize the gate shown. By proper design, the gate can be made to keep inaccuracy to a minimum. The magnitude of the standard voltage that is applied at a junction 84 of the gate 101 is below the breakdown voltage of a diode 106, for example, a Zener diode. As a result, diode 106 is open and does not conduct. When the comparator and amplifier unit 62 flips high and an output signal is produced thereby, such output is applied across a current limiting resistor 112 to a junction 109. The anodes of diodes 106 and 107 are also connected to junction 109. When the output of unit 62 is applied across resistor 112, the potential at junction 109 is positive with respect to junction 84 and diode 106 then closes to conduct the magnitude of the standard voltage at junction 84 through diodes 106 and 107, a junction 111 and a junction 85 to the succeeding common junctions of the succeeding stages of the converter. The negative bias, $E_b$, applied at terminal 114 is applied across current limiting resistor 113 to junction 111. Also connected to junction 111 is the anode of a third diode 108 a Zener diode for example, its cathode being connected to ground. The absolute value of the bias voltage is greater than the value of the standard voltage, $E_s$ as indicated by the symbol $|-E_b|>E_s$ by the bias terminal 114. This bias voltage is provided to assure that the cathode of diode 107 will always be negative with respect to its anode. Since the value of the analog input signal is available at junction 85, the absolute value of the negative bias source exceeds the greatest possible positive signal that could appear at junction 85. The diode 108 is provided to clamp the negative polarity of the gated signal to ground and to remove the negative noise pulse which normally appears when the gate is closed. So it is seen, that when the comparator operates, the positive signal applied to junction 109 thereby will open the gate 101 to provide on junction 85 the same magnitude of the fraction of the standard voltage which appears on junction 84.

Figure 7:
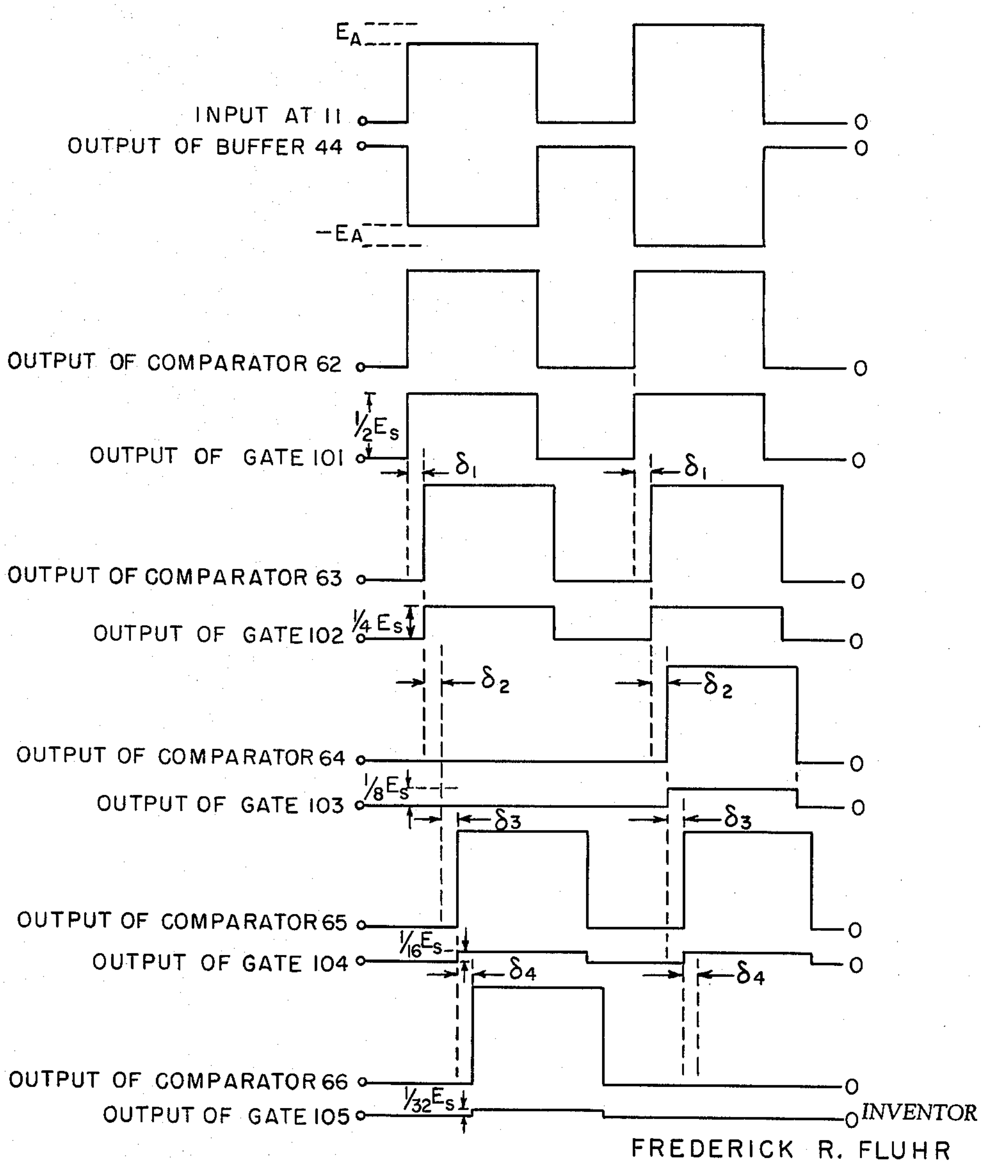
FIG. 7 shows typical waveforms of the operation of the converter.

FIG. 7 shows the waveforms of the operation of the converter. The input at input 11 is shown by the top waveform and is the analog voltage to be converted to digital bits. The two rectangular waves shown are of different heights, the first being lower than the second. After this input voltage has passed through the buffer amplifier 44 as shown in FIG. 1, the output of the buffer 44 is shown in the second waveform and it is readily apparent that this output is a mirror image of the input voltage with the absolute values being the same. Since both of the input voltages are greater than one half of the standard voltage, comparator 62 becomes operative and its output is shown in the third line as being operative for both of the two input pulses. The operation of comparator 62 renders gate 101 operative to provide at junctions 85 through 88 the voltage level of one half of the standard voltage as shown in the fourth waveform of FIG. 7. Both of the two input voltages are greater than ¾ of the standard voltage and therefore comparator 63 operates as shown in the fifth line of FIG. 7. It is to be noted that this output of comparator 63 is delayed by an amount δ1 from the output of the first comparator 62. This is accounted for by the time required for the comparators and amplifiers to stabilize. As a result of the operation of comparator 63 the gate 102 is operative to provide a potential at junctions 91, 92, 93 which is equal to one fourth the standard voltage and is as shown in the sixth line in FIG. 7. The first input analogue signal is of such magnitude that it fails to operate comparator 64 but the second input voltage is of the proper magnitude to operate comparator 64 to provide an output with the delay δ2 as shown in the seventh waveform of FIG. 7. Since gate 103 was not operated during the first input voltage there is no output present at junctions 95 and 96 but since gate 103 was operative during the second input voltage a potential equal to one eighth of the standard voltage is available at junctions 95 and 96 with the delay δ3 therefor. Comparator 65 is operative during both of the input signals and the output of gate 104 at junction 98 is shown as being one-sixteenth of the standard voltage. The output comparator 66 is operative during the first input pulse to provide an output from gate 105 to be applied to 1/32 of the standard voltage. The output of the several gates are subtracted from the succeeding stages. It is noted that there is no stage following gate 105 and, therefore, since there is no stage from which the output value is to be subtracted, gate 105 can be omitted.

The delays in the operation of the several stages of the comparator as designated by δ1, 2, 3, and 4 are the result of the times required: for the circuits of the converter to stabilize in response to the input analog signal, by the operation of the comparator and amplifier units, and by the operation of the gates.

In conclusion, it is seen that the circuit of this invention is a very high speed analog to digital converter which combines a reasonable degree of accuracy with high speed of operation. The converter is stable and its speed limitations are its own and not those of an outside control means.

Obviously many modifications and variations of the present invention are possible in the light of the above teachings. It is therefore to be understood that within the scope of the appended claims the invention may be practiced otherwise than as specifically described.

What is claimed is:

1. In an open ended analog to digital converter, an analog input signal, means for inverting said analog input signal, a standard voltage source, means for providing a plurality of different fixed fractional magnitudes of the standard voltage related as to successive powers of two, the polarity of said different magnitudes being opposed to the polarity of the inverted analog input signal, a plurality of bi-stable comparators, each with an input terminal and an output terminal, a plurality of common junctions, means for applying the inverted analog input signal to said plurality of common junctions, means for applying a different one of each of th different magnitudes of standard voltage to one of each of said common junctions, the input terminal of one of each of said comparators being operable to experience a change of state when the analog signal exceeds the standard voltage magnitude at the common junction connected thereto, and a plurality of gate means, one of each of said gate means being connected to a comparator for each stage preceding the last, to the fractional magnitude of the standard voltage for that comparator and to each succeeding common junction to subtract that magnitude of said standard voltage from said analog input signal at the succeeding junctions under control of individual comparator output.

2. In an open ended analog to digital converter, an analog input signal, means for inverting said analog input signal, a standard voltage source, means for providing a plurality of different fixed fractional magnitudes of the standard voltage, the polarity of said different magnitudes being opposed to the polarity of the inverted analog input signal, a plurality of bi-stable comparator and amplifier units, a plurality of common junctions, means for applying the inverted analog input signal to said plurality of common junctions, means for applying one of each of the different magnitudes of standard voltage to one of each of said common junctions, the input of one of each of said units being connected to one of each of said common junctions and each of said units being operable to experience a change of state when the analog signal exceeds the standard voltage magnitude at the common junction thereof, and a plurality of gate means, one of each of said gate means connected to a comparator for each stage preceding the last, to the fractional magnitude of the standard voltage for that comparator and to the succeeding common junctions to subtract the magnitude of said standard voltage from said analog input signal at the succeeding junctions during the production of an output signal by the connected comparator.

3. In an open ended analog to digital converter, an analog input signal, means for inverting said analog input signal, a standard voltage source, means for providing a plurality of different fixed fraction magnitudes of the standard voltage, the polarity of said different magnitudes being opposed to the polarity of the inverted analog input signal, a plurality of bi-stable comparators, a plurality of common junctions, means for applying the inverted analog input signal to said plurality of common junctions, means for applying one of each of the different magnitudes of standard voltage to one of each of said common junctions, the input of one of each of said comparators being connected to one of each of said common junctions and each of said comparators being operable to experience a change of state when the analog signal exceeds the standard voltage level at the common junction thereof, and a plurality of gate means, one of each of said gate means being connected to a comparator for each stage preceding the last, to the fractional magnitude of the standard voltage for that comparator and to each succeeding common junction to subtract the magnitude of said standard voltage from said analog input signal at the successive junctions under control of individual comparator output.

4. In an open ended analog to digital converter, means for providing an analog input signal of selected polarity, a standard voltage source of polarity opposed to that of the input signal, reference means for providing a plurality of graduated magnitude fractions of the standard voltage each being one half of the preceding, a plurality of impedance devices of standard magnitude, a plurality of common junctions, one for each fraction of the standard voltage, the one for each fraction being connected in that fraction source and individually to each preceding fraction source through separate impedance devices.

a plurality of comparators, one for each junction operative to provide an indentifiable signal when the potential of that junction attains a selected level, and a plurality of gate means, one for each comparator preceding the comparator for the minimum fraction of standard voltage, each connected to the corresponding comparator and to the corresponding fraction of the standard voltage to block the application of that fraction of the standard voltage to the succeeding common junctions except during the identifiable signal from the corresponding comparator.

(References on following page)

References Cited in the file of this patent

UNITED STATES PATENTS

| | | |
|---|---|---|
| 2,453,454 | Norwine | Nov. 9, 1948 |
| 2,570,221 | Earp | Oct. 9, 1951 |
| 2,630,481 | Johnson | Mar. 3, 1953 |
| 2,715,678 | Barney | Aug. 16, 1955 |
| 2,715,724 | Oberman | Aug. 16, 1955 |
| 2,733,432 | Beckman | Jan. 31, 1956 |
| 2,754,503 | Forbes | July 10, 1956 |
| 2,762,038 | Lubkin | Sept. 4, 1956 |
| 2,765,405 | Gramarekian | Oct. 2, 1956 |
| 2,945,220 | Lesti | July 12, 1960 |